United States Patent
Ritzow

Patent Number: 5,263,772
Date of Patent: Nov. 23, 1993

[54] AQUARIUM STAND

[75] Inventor: Gerald R. Ritzow, Franklin, Wis.

[73] Assignee: All-Glass Aquarium Co., Inc., Franklin, Wis.

[21] Appl. No.: 833,553

[22] Filed: Feb. 10, 1992

[51] Int. Cl.$^5$ ............... A44B 87/00; A01K 63/00
[52] U.S. Cl. .................... 312/138.1; 312/107; 312/111; 119/247
[58] Field of Search ......... 312/138.1, 139.1, 107, 312/108, 111; 119/5

[56] References Cited

U.S. PATENT DOCUMENTS

| | | | |
|---|---|---|---|
| 2,807,387 | 9/1957 | Siciliano | 312/111 |
| 3,512,857 | 5/1970 | Butera | 312/111 |
| 3,653,734 | 4/1972 | Ungaro | 312/107 |
| 3,807,357 | 4/1974 | Hall | 119/5 |
| 4,056,295 | 11/1977 | Downing | 312/107 |
| 4,118,084 | 10/1978 | Sussman | 312/111 |
| 4,577,914 | 3/1986 | Stravitz | 312/107 |
| 4,807,565 | 2/1984 | Hawthorne | 119/5 |

OTHER PUBLICATIONS

"Quality Aquarium Products Since 1967", All-Glass Aquarium Co., Inc., 9675 South 60th Street, Franklin, Wis. 53132, Jun. 1989.

"Designer Aquarium", All-Glass Aquarium Co., Inc. 9675 South 60th Street, Franklin, Wis, 53132, Nov. 1990.

Primary Examiner—Victor N. Sakran
Attorney, Agent, or Firm—Andrus, Sceales, Starke & Sawall

[57] ABSTRACT

An aquarium stand (10) is provided for a removable aquarium tank (44) and has an upper horizontally extending guide track provided by channels (80, 74) receiving border frames (58, 62) of the tank in horizontal sliding relation and providing keyed flush fit preventing lateral shifting movement of the tank.

12 Claims, 3 Drawing Sheets

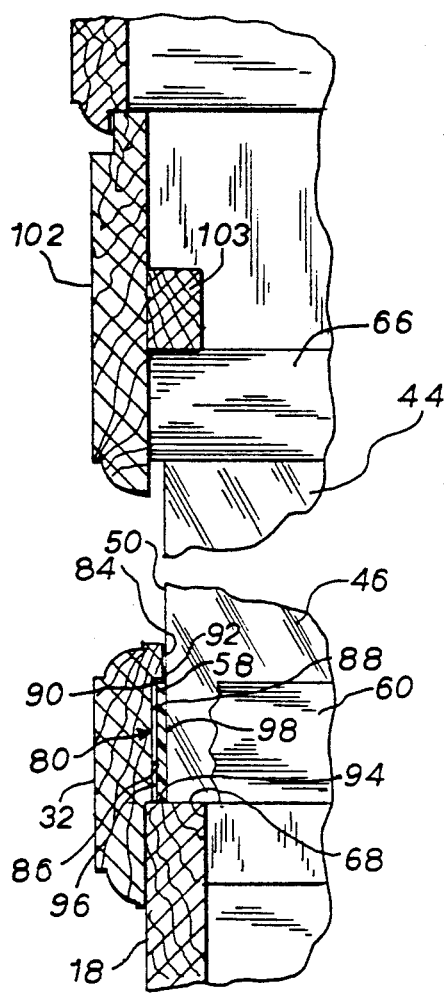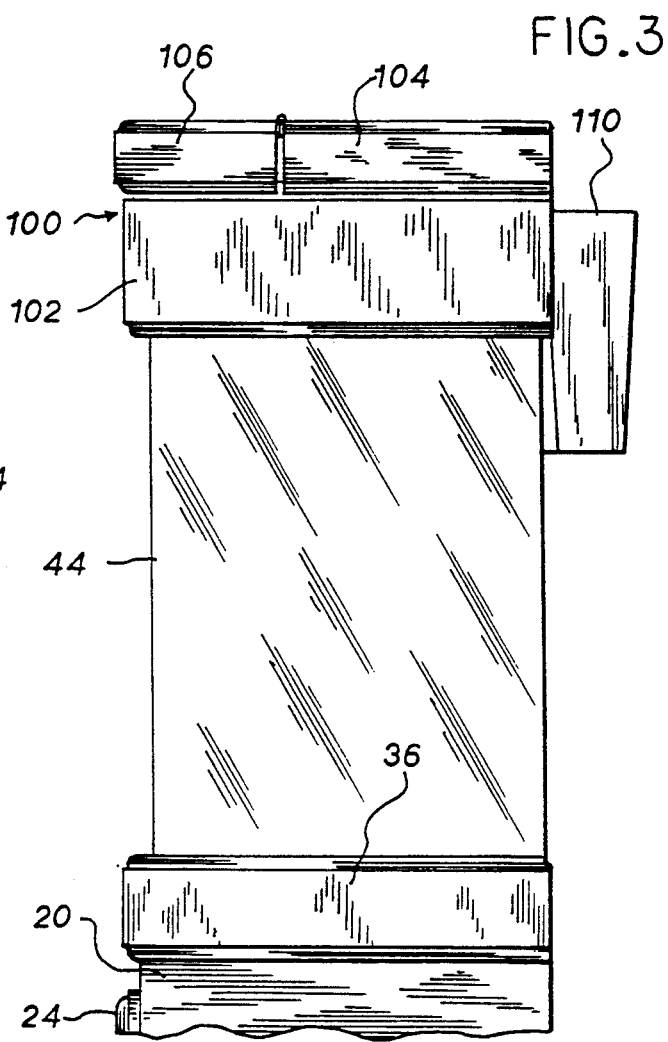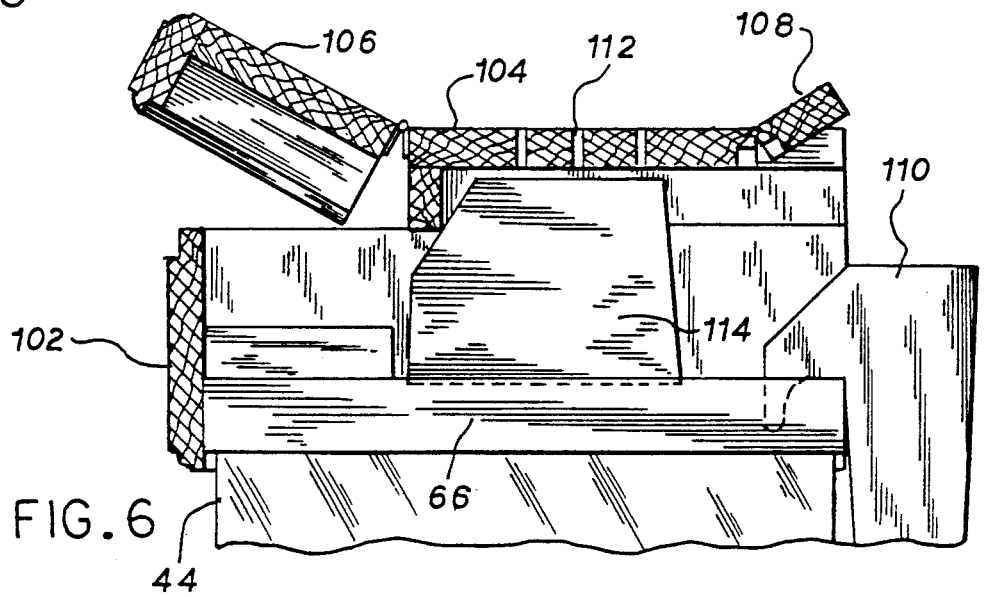

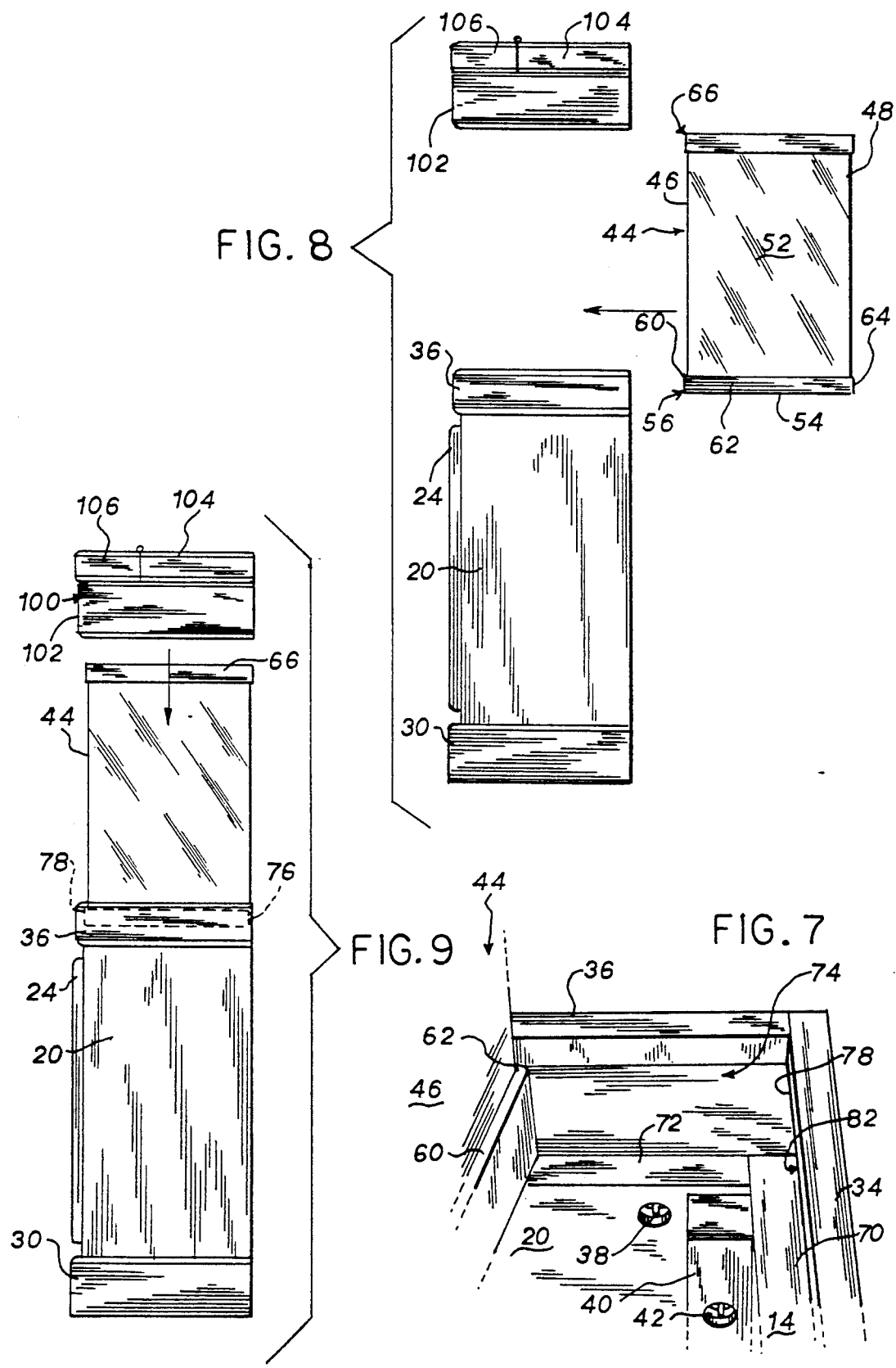

AQUARIUM STAND

BACKGROUND AND SUMMARY

The invention relates to aquarium stands for supporting a removable aquarium tank.

Aquarium tanks typically include glass sidewalls bonded to each other along their corners and to a glass bottom wall. The tank has upper and lower border frames, which may be wood, plastic or metal, extending horizontally around the tank and bonded thereto along the tops and bottoms of the sidewalls. The border frames serve as fitting jigs during assembly of the aquarium, and are left in place bonded to the sidewalls to protect the edges of the glass wall during shipment. In the end use of the aquarium, the border frames are usually left in place bonded to the sidewalls, and the tank is supported on a horizontal surface of an aquarium stand.

The present invention provides an aquarium stand having a base with an upper horizontally extending guide track receiving the tank at its lower border frame in horizontal sliding and flush fit relation. The guide track and flush fit confine the tank and prevent undesired lateral shifting movement of the tank, to prevent the tank from being unintentionally pushed off the aquarium stand by being bumped, or sliding or "walking" off the stand due to vibration or tremors.

BRIEF DESCRIPTION OF THE DRAWINGS

FIG. 3 is a side view of a portion of the structure of FIG. 1.

FIG. 4 is a partial sectional view of a portion of the structure of FIG. 1.

FIG. 5 is a partial sectional view of a portion of the structure of FIG. 1.

FIG. 6 is a partial sectional view of a portion of the structure of FIG. 1.

FIG. 7 is a perspective view of a portion of the structure of FIG. 1 during mounting of the tank to the aquarium stand.

FIG. 8 illustrates mounting of the tank to the aquarium stand.

FIG. 9 illustrates mounting of the top canopy to the tank.

DETAILED DESCRIPTION

Figure 1:
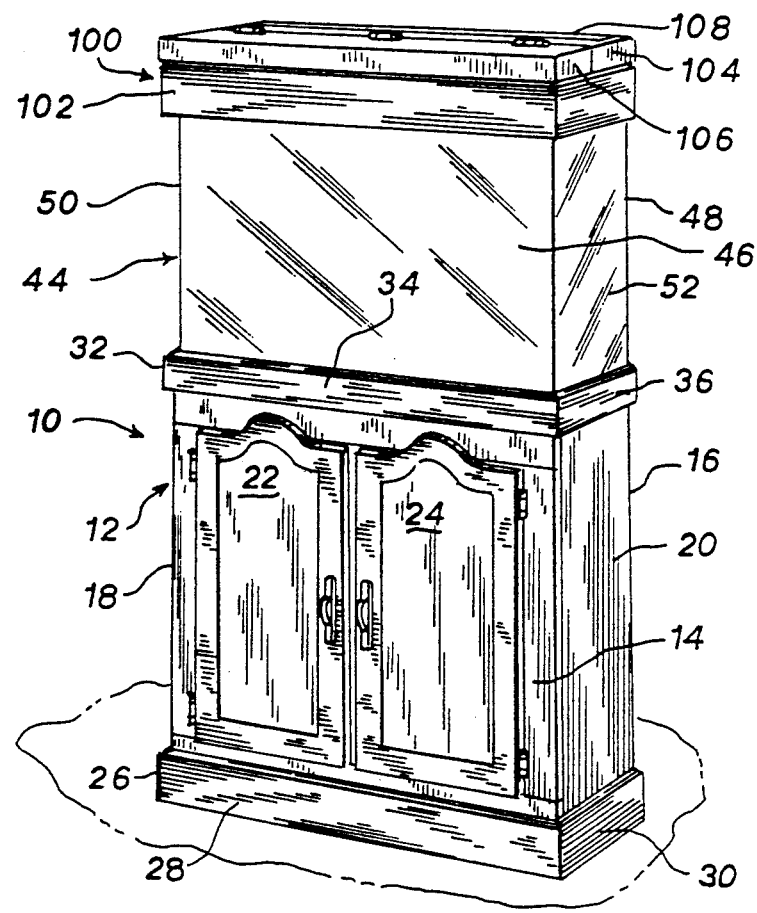
FIG. 1 is a perspective view of an aquarium stand supporting an aquarium tank in accordance with the invention.

FIG. 1 shows an aquarium stand 10 including a base 12 formed by front and back walls 14 and 16 and left and right sidewalls 18 and 20. Front wall 14 has a pair of hinged openable doors 22 and 24 providing access to the interior of the stand for storage or the like. Left, front and right walls 18, 14 and 20 have lower trim moldings 26, 28 and 30, respectively, mounted thereto. Left, front and right sidewalls 18, 14 and 20 have upper trim moldings 32, 34 and 36, respectively, mounted thereto, and providing an upper horizontally extending inner guide track, to be described. Trim moldings 26, 28, 30, 32, 34 and 36 are mounted to the respective sidewall by screws such as 38, FIG. 7, from inside the base. The inside corners of the base are reinforced by corner posts such as 40, FIG. 7, secured to the respective sidewalls by screws such as 42. It is preferred that the base, including the sidewalls, doors, and upper and lower trim moldings be furniture-quality wood, such as oak.

Aquarium tank 44, FIGS. 1 and 8, has front and back glass sidewalls 46 and 48 and left and right glass sidewalls 50 and 52 bonded to each other along their corners and to a glass bottom wall 54. The tank has a lower circumferential border frame 56 extending horizontally around the tank along the bottom of the glass sidewalls, and including a left border frame 58, FIG. 5, bonded to glass sidewall 50, a front border frame 60 bonded to glass wall 46, a right border frame 62 bonded to glass sidewall 52, and a back border frame 64 bonded to glass wall 48. The bottom edge of border frame 56 is aligned to be substantially flush with the bottom edge of the tank. An upper circumferential border frame 66 extends horizontally around the tank and is bonded to the tops of the glass walls, comparably to lower border frame 56. Upper and lower border frames 66 and 56 are preferably wood, such as oak, though they may be of other materials such as metal or plastic. The border frames serve as fitting jigs during assembly of the aquarium, and are left in place bonded to the glass walls to protect the edges of the glass walls during shipment.

Figure 2:
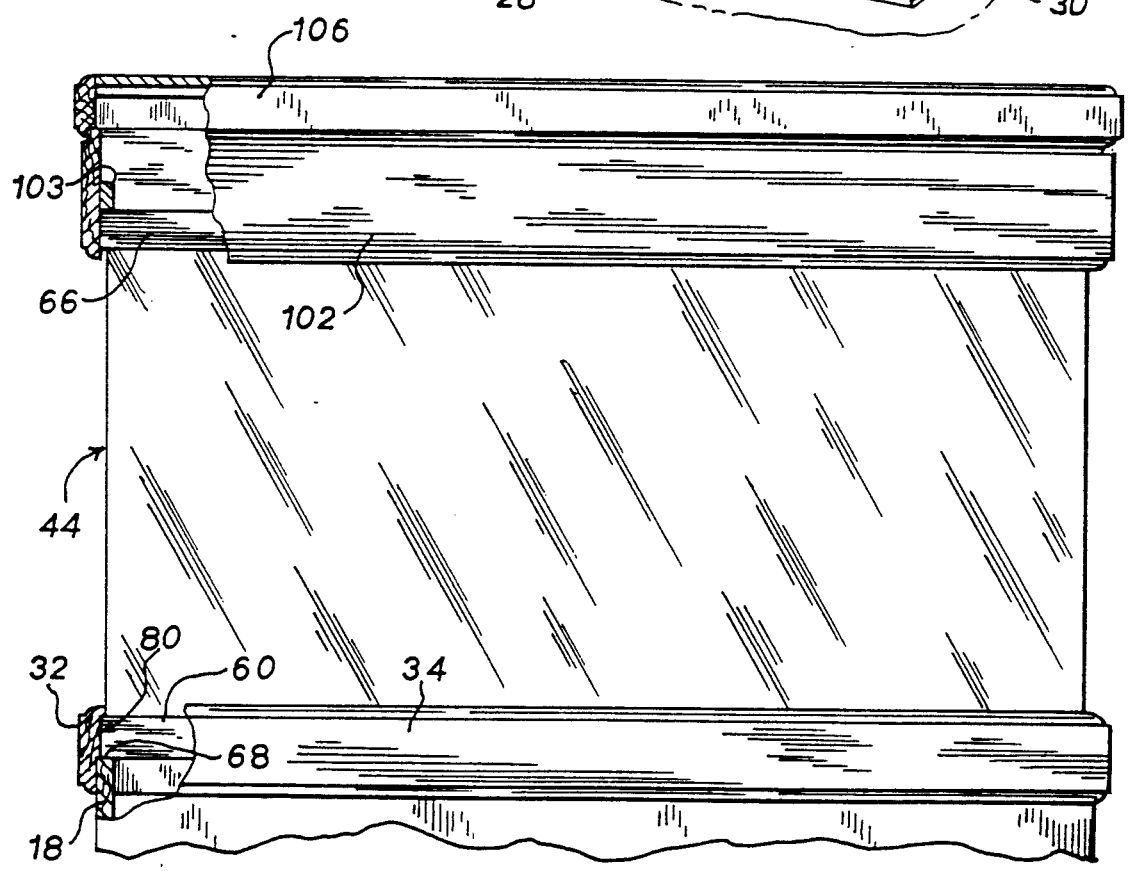
FIG. 2 is a front view of a portion of the structure of FIG. 1 partially cut away.

Left, front and right sidewalls 18, 14 and 20, respectively, of stand 10 have respective top horizontal surfaces 68, 70 and 72, FIGS. 2 and 7, providing a support surface supporting tank 44. Upper right trim molding 36 has an inner surface providing a right side channel 74, FIG. 7. Channel 74 has an open rear end 76, FIG. 9, for receiving lower right border frame 62 in horizontal sliding relation. Channel 74 has a closed front end 78, FIGS. 9 and 7, with a front stop provided by front trim molding 34 to stop forward sliding movement of tank 44. Left trim molding 32, FIGS. 2 and 5, has an inner surface providing a left side channel 80 similar to channel 74. Left side channel 80 has an open rear end for receiving tank border frame 58 in horizontal sliding relation. Left side channel 80 has a closed front end with a front stop provided by front trim molding 34 stopping forward sliding movement of tank 44. Front trim molding 34 also has an inner surface providing a front channel 82 receiving front border frame 60 when tank 44 is slid fully forward.

Referring to FIG. 5 and left side channel 80 provided by trim molding 32, an upper lip 84 is substantially flush against glass sidewall 50 of the tank and is spaced above support surface 68 by a recessed surface 86 spaced horizontally outwardly of sidewall 50 by a gap 88. Border frame 58 along sidewall 50 is in gap 88 and has a width slightly less than the width of gap 88, and a height slightly less than the height of recessed surface 86. Left side channel 80 of the guide track includes upper and lower horizontal surfaces 90 and 68 vertically spaced by vertical surface 86 therebetween. Border frame 58 includes upper and lower horizontal surfaces 92 and 94 vertically spaced by left and right spaced vertical surfaces 96 and 98 extending therebetween. Lower horizontal surface 68 of channel 80 faces and engages and supports lower horizontal surface 94 of border frame 58 and the lower edge of tank 44 and supports the tank. Recessed vertical surface 86 of channel 80 faces vertical surface 96 of border frame 58. Upper horizontal surface 90 of channel 80 faces upper horizontal surface 92 of border frame 58. Vertical surface 98 of border frame 58 faces and engages and is bonded to sidewall 50 of tank 44. Vertical surface 86 of channel 80 extends downwardly from horizontal surface 90 of channel 80. Vertical surface 84 of the channel extends upwardly from horizontal surface 90 and substantially flushly faces sidewall 50 of the tank above vertical surface 98 of border frame 58. The cross sectional profile of each channel 74, 80, 82 is identical.

Left and right side channels 80 and 74 provide a horizontally extending guide track receiving the lower border frame of tank 44 in horizontal sliding relation, and together with front channel 82 provide a substantially flush fit against the tank sidewalls and lower border frame and prevent lateral shifting movement of the tank leftwardly, forwardly and rightwardly. The tank may be removed from the base only by sliding the tank rearwardly along the side channels until clear of such channels. The stand is typically positioned with its back against a wall, which limits the amount of rearward movement of the tank. The stand must be moved away from the wall in order to remove the tank.

Lower border frame 56 of the tank is used as a guide rail, and the recessed channel guide track between support surface 68 and upper lip 84 is provided with a configuration keyed to and mating with such guide rail border frame. The guide rail border frame is horizontally slidable along the recessed channel guide track, as shown in FIG. 8.

A top canopy 100, FIG. 1, is slid downwardly, FIG. 9, over the top of tank 44 and has a lower skirt 102 covering upper border frame 66. The skirt has an inner shoulder 103 resting on top of the tank. The canopy includes an upper portion 104 having a front hinged lid 106 providing access for cleaning and feeding, and a rear hinged lid 108 providing access to filter 110, which is desirable when the stand is positioned against a wall. Upper portion 104 has openings 112 for venting heat from lamp 114 straddling and resting on the tops of left and right tank walls 50 and 52. It is preferred that canopy 100 be furniture-quality wood matching base 12.

It is recognized that various equivalents, alternatives and modifications are possible within the scope of the appended claims.

I claim:

1. An aquarium stand for supporting a removable aquarium tank having a glass sidewall and a border frame along said sidewall, said stand comprising a base having a support surface supporting said tank, and having an upper lip vertically spaced above said support surface by a recessed surface spaced horizontally outwardly of said sidewall by a gap, the upper lip being substantially flush against said sidewall and confining said tank and preventing lateral shifting movement of said tank in a given horizontal direction.

2. The invention according to claim 1 wherein said border frame is in said gap.

3. The invention according to claim 2 wherein said gap has a given width, and said border frame has a width slightly less than said given width.

4. The invention according to claim 3 wherein said recessed surface has a given height, and said border frame has a height slightly less than said given height.

5. An aquarium stand for supporting a removable aquarium tank having a sidewall and a lower border frame extending horizontally along the bottom of said sidewall and at least partially around said tank, said stand comprising a base having an upper horizontally extending guide track comprising a pair of spaced side channels each having a front end and a rear end, and a front stop at the front end of said side channels, such that said tank is slidable forwardly along said side channels until stopped by said front stop, and is slidable rearwardly along said side channels to remove said tank from said base, each of said side channels of said guide track comprises first and second horizontal surfaces vertically spaced by a vertical surface extending therebetween wherein said vertical surface of said side channel extends downwardly from said second horizontal surface of said side channel, and wherein each said side channel comprises a second vertical surface extending upwardly from said second horizontal surface of said side channel and substantially flushly facing said sidewall of said tank above said second vertical surface of said border frame, and wherein said border frame comprises first and second horizontal surfaces vertically spaced by first and second spaced vertical surfaces extending therebetween, wherein said first horizontal surface of said side channel faces and engages and supports said first horizontal surface of said border frame and supports said tank on said base, said vertical surface of said side channel faces said first vertical surface of said border frame, said second horizontal surface of said side channel faces said second horizontal surface of said border frame, said second vertical surface of said border frame faces and engages and is bonded to said sidewall of said tank.

6. An aquarium stand for supporting a removable aquarium tank having a sidewall and a guide rail border frame along said sidewall, said stand comprising a base having a support surface supporting said tank, an upper lip above said support surface and substantially flush against said sidewall and confining said tank and preventing lateral shifting movement of said tank in a given horizontal direction, and a recessed channel guide track between said support surface and said upper lip and having a configuration keyed to and mating with said guide rail border frame.

7. The invention according to claim 6 wherein said guide rail border frame is horizontally slidable along said recessed channel guide track.

8. A method for flush mounting an aquarium tank on an aquarium stand comprising providing an aquarium stand having a base with an upper support surface and an upper lip above said support surface, providing a recessed channel guide track between said support surface and said upper lip, providing an aquarium tank having a sidewall and a guide rail border frame along said sidewall and having a configuration keyed to and mating with said guide track, and supporting said tank on said support surface such that said upper lip is substantially flush against said sidewall.

9. The method according to claim 8 comprising installing said tank on said base by sliding said tank along said guide track.

10. The method according to claim 9 comprising sliding said guide rail border frame horizontally along said recessed channel guide track.

11. A method for removably mounting an aquarium tank on an aquarium stand comprising providing an aquarium stand having a base with a horizontally extending guide track having a vertical surface, providing an aquarium tank having a sidewall and a border frame extending horizontally along said sidewall and at least partially around said tank, sliding said tank horizontally into said base such that said vertical surface is substantially flush against said sidewall.

12. The method according to claim 11 wherein said tank is slidable forwardly and rearwardly on said base along said guide track, and comprising providing a stop stopping forward movement of said tank, and installing said tank by sliding said tank forwardly until stopped by said stop, and removing said tank by sliding said tank rearwardly until clear of said guide track, and such that all horizontal movement of said tank is prevented, except said rearward movement, and such that said tank is removable from said base only by said rearward movement.

* * * * *